United States Patent [19]

Johnson et al.

[11] Patent Number: 5,609,692
[45] Date of Patent: Mar. 11, 1997

[54] METHOD OF REMOVING CHLORIDE ION OR A COMPOUND THEREOF FROM A SURFACE CONTAMINATED THEREWITH

[75] Inventors: James R. Johnson, Chandler; Jerry J. Colahan, Mesa; Todd R. Eden, Scottsdale, all of Ariz.

[73] Assignees: Chlor Rid International, Inc., Chandler; H.E.R.C. Products Incorporated, Phoenix, both of Ariz.

[21] Appl. No.: 238,594

[22] Filed: May 5, 1994

[51] Int. Cl.$^6$ .................................................. C23G 1/02
[52] U.S. Cl. ................................................ 134/3; 134/41
[58] Field of Search ............................... 134/2, 3, 41

[56] References Cited

U.S. PATENT DOCUMENTS

| | | | |
|---|---|---|---|
| 3,971,628 | 7/1976 | Bresle | 21/2.7 R |
| 4,111,830 | 9/1978 | Bannister | 422/17 |
| 4,170,671 | 10/1979 | Hirasawa et al. | 427/388 C |
| 4,225,564 | 9/1980 | Tolley | 423/81 |
| 4,435,303 | 3/1984 | Abadi | 252/80 |
| 4,487,959 | 12/1984 | Dickerson | 560/248 |
| 4,797,220 | 1/1989 | Miller | 252/82 |
| 5,124,362 | 6/1992 | Auerswald et al. | 521/26 |
| 5,198,082 | 3/1993 | Vennesland et al. | 204/130 |
| 5,228,959 | 7/1993 | Miller | 204/130 |
| 5,268,092 | 12/1993 | Eden | 210/96.1 |
| 5,275,752 | 1/1994 | Hansen | 252/70 |
| 5,296,042 | 3/1994 | Curran et al. | 134/41 |
| 5,296,120 | 3/1994 | Bennett et al. | 204/196 |
| 5,322,635 | 6/1994 | Hieatt et al. | 252/82 |

FOREIGN PATENT DOCUMENTS

| | | |
|---|---|---|
| 234583 | 12/1989 | Japan . |
| 1109743 | 4/1968 | United Kingdom . |
| 1470279 | 4/1977 | United Kingdom . |

OTHER PUBLICATIONS

Hatle, L. L. et al., "A New Method for Achieveing Zero Detectable Soluble Salt Contamination on Substrates", SuperClean, Inc., (Mar. 1993).

Flores, S., "Methods for Sampling and Analyzing Soluble Salts on Steel Surfaces: A Comparative Study", Journal of Protective Coatings & Linings, (Mar. 1994), pp. 76–83.

*Primary Examiner*—Zeinab El-Arini
*Attorney, Agent, or Firm*—Wood, Herron & Evans, P.L.L.

[57] ABSTRACT

A method of removing chloride ion, a compound thereof, or flash rust (metal oxide) from a surface contaminated with chloride. The method includes the steps of providing a surface contaminated with chloride ion, a compound thereof or flash rust, and applying a dilute aqueous solution containing an active agent selected from the group consisting of an amine, anionic surfactant, organic carboxylic acid, organic sulfonic acid, and mixtures thereof to the surface in an amount sufficient to remove substantially all of the chloride ion, compound thereof, or flash rust from the surface.

15 Claims, No Drawings

METHOD OF REMOVING CHLORIDE ION OR A COMPOUND THEREOF FROM A SURFACE CONTAMINATED THEREWITH

BACKGROUND OF THE INVENTION

The exposure of metallic, concrete and plastic surfaces to chloride ion results in contamination with chloride ion, chloride derivatives and flash rust (metal oxide), and in corrosion of associated surfaces. Chloride contamination eventually leads to destructive results such as coating adhesion failure, cement cracking due to rebar corrosion, and the like.

Water soluble chloride salt contamination of surfaces, particularly steel and iron surfaces, has always been a major cause of coating failure. Coating failure or debonding is initiated by substrate corrosion due to residual chloride presence which results in ferrous chloride being formed under the coating surface. If oxygen is present, the ferrous chloride is oxidized to ferric chloride which absorbs moisture from the air and forms a concentrated ferric chloride solution. This solution causes electrochemical corrosion and rusting under the coating and ultimately results in coating failure. In general, chloride contaminants must be completely removed from the surface to avoid future coating failures.

Chloride contamination of rebar in concrete poses another serious problem. If the rebar becomes contaminated with chloride, corrosion products will build up on the rebar within the concrete. These corrosion products may have up to four times the volume of the original rebar, resulting in stressing and eventually cracking and deterioration of the concrete, rendering it substandard or unsatisfactory for its intended use.

Furthermore, flash rust (metal oxide) may develop on metal surfaces contaminated with chloride, further promoting coating failure and adding undesirable color.

No standards exist as to the particular level of chloride ion or soluble salts that can be tolerated by particular surfaces in various applications, and performance of the surfaces depends quite heavily on the particular environment. For example, some of the most difficult applications include off-shore oil drilling rig platforms, and highways heavily salted to remove ice and snow during the winter months. Furthermore, some coatings are porous, providing increased opportunity for chloride contamination and subsequent coating failure. Given the variety of applications in which metallic, concrete and plastic surfaces are used, and the lack of a standard as to the tolerable level of chloride ion contamination, the best performance for any coating or environment will result if the surface is free of chloride ion or soluble salts prior to the application of the coating.

Various methods have been employed to remove chloride ion and other scale-like derivatives from contaminated surfaces, with each method having its own drawbacks. For example, high or ultra high pressure washing (i.e., up to 20,000 psig) and water blasting with hard grit both require expensive equipment as well as workers who are fully trained in the proper use of the equipment. Also, when the contaminated surface is loaded with heavy scale, this scale can prevent the water jet from dissolving the underlying chloride salts, and these methods typically do not result in the complete removal of chloride ion or chloride derivatives.

Mineral acid washing is also employed, followed by water rinsing. However, this process is not always effective and may leave residues on the surface unless the surface is washed extensively with deionized or distilled water. Also, the process may result in flash rusting. Furthermore, acids are particularly dangerous when used in enclosed areas such as tanks, etc., and also impose an environmental hazard and disposal problems.

Dry blasting with an air driven abrasive followed by water rinsing also has been utilized. However, several treatments usually are required to achieve a substantial reduction in residual chloride contamination on the treated surface which has been cleaned of other scale-like deposits such as iron oxide or rust. The process is labor intensive and time consuming and requires a considerable amount of abrasive, all of which add to the cost. Also, sand blasting may be used to remove old coatings and rust, but usually it does not remove any substantial amount of the chloride contamination.

Recently, an aqueous jet blasting method employing a sodium bicarbonate soft grit abrasive followed by a high purity water rinse has been claimed to achieve "zero detectable" salt concentrations on the substrate being cleaned (National Corrosion Engineers, T-14 Unit Committee Meeting, Mar. 9, 1993, "A New Method for Achieving Zero Detectable Soluble Salt Contamination on Substrates", by Loren L. Hatle and J. R. Cook). This process still requires proper ventilation for the workers and the disposal of the abrasive, along with precise control of the bicarbonate abrasive composition and use of high purity water in order to achieve low residual chloride levels.

Therefore, it is desirable to have a method for removing chloride ion or other corrosive scale-like derivatives from a contaminated surface where the method is effective yet simple to use.

SUMMARY OF THE INVENTION

One aspect of this invention is directed to a method of removing chloride ion or a compound thereof from a surface contaminated with chloride. The method comprises the steps of providing a surface contaminated with chloride ion or a compound thereof and applying a dilute aqueous solution containing an active agent selected from the group consisting of an amine, anionic surfactant, organic carboxylic acid, organic sulfonic acid, and mixtures thereof to the surface in an amount sufficient to remove substantially all of the chloride ion or compound thereof from the surface.

Typically, the surface will be a metallic, concrete, plastic or plastic laminated surface contaminated with chloride ion or a chloride derivative. If a plastic surface is involved, the plastic is most likely to be an epoxy or vinyl, while if a metal surface is involved, the metal is likely to be steel, iron or aluminum.

Another aspect of the inventive method is the removal of flash rust (metal oxide) from a metal surface contaminated with chloride ion or a chloride derivative.

The dilute aqueous solution contains an active agent or a mixture of active agents typically representing from about 0.005% to about 10% by weight of the overall aqueous solution, and preferably, the solution is made from deionized water.

If an amine is used in the dilute aqueous solution, the amine preferably is selected from the group consisting of ammonia, monoisopropanolamine, diisopropanolamine, triisopropanolamine, monoethanolamine, diethanolamine, triethanolamine, diethylamine, and mixtures thereof. If an organic carboxylic acid is used, the acid preferably is selected from the group consisting of hydroxyacetic, citric, acetic, gluconic, salicylic, tartaric, benzoic and mixtures thereof. If an anionic surfactant is used in the solution, the surfactant preferably is sodium xylenesulfonate.

If desired, the dilute aqueous solution may contain a mixture of different active agents, with two mixtures being preferred. One such mixture is a mix of hydroxyacetic acid, sodium xylenesulfonate, triethanolamine and diethanolamine. In this mixture, preferably the hydroxyacetic acid represents from about 20% to about 70% by weight of the mixture, the sodium xylenesulfonate represents from about 5% to about 20% by weight of the mixture, the triethanolamine represents from about 10% to about 50% by weight of the mixture and the diethanolamine represents from about 2% to about 10% by weight of the mixture. More preferably, the hydroxyacetic acid represents about 50% by weight of the mixture, the sodium xylenesulfonate represents about 12%, the triethanolamine represents about 33% and the diethanolamine represents about 5% by weight of the mixture.

Another preferred mixture of active agents in the dilute aqueous solution is a mix of triethanolamine, diethanolamine and hydroxyacetic acid. Preferably, the triethanolamine represents from about 0.005% to about 25% by weight of the mixture, the diethanolamine represents from about 0.005% to about 10% and the hydroxyacetic acid represents from about 0.005% to about 35%, with the balance being water. More preferably, the mixture is a 50% solution of the 1:1 stoichiometric soap of 85% triethanolamine/15% diethanolamine and hydroxyacetic acid, with the mixture having a pH of about 7.

The inventive method has several benefits and advantages over existing methods of chloride ion removal. For example, the method does not require expensive equipment or workers specially trained in the use of such equipment. Also, the method uses materials which are relatively easy to handle and to apply, thereby lowering overall costs.

These benefits and advantages along with other aspects of the invention will be further understood with reference to the following detailed description.

DETAILED DESCRIPTION OF THE INVENTION

The present invention provides an improved method of removing chloride ion or a compound containing chloride ion from a surface contaminated with chloride. The method is accomplished by providing a surface contaminated with chloride ion or a chloride containing compound, and applying a dilute aqueous solution containing an active agent or mixture of active agents to the contaminated surface in an amount sufficient to remove essentially all of the chloride ion or compound containing chloride from the surface.

The surfaces usually involved in chloride ion contamination include metallic, concrete, plastic and plastic laminated surfaces. Where plastic is involved, the plastic is often an epoxy or vinyl, and in most metal applications, the metal is steel, iron or aluminum. These materials provide some of the basic building blocks for use in applications which often are exposed to chloride ion, such as storage tanks, bridges, structural steel, oil drilling rigs, highways, etc. Chloride ion reacts with these materials, eventually leading to destructive results such as coating adhesion failure, cement cracking due to rebar corrosion, and the like.

The invention also provides a method for removing flash rust (metal oxide) from a metal surface contaminated with chloride ion or a chloride derivative.

In removing chloride ion or flash rust from the surfaces discussed above, a dilute aqueous solution containing an active agent is applied to the contaminated surface. The active agent may be selected from the group consisting of an amine, anionic surfactant, organic carboxylic acid, organic sulfonic acid, and mixtures thereof. The preparation and composition of these various active agents is well documented in U.S. Pat. Nos. 5,268,092 and 5,322,635 and co-pending U.S. patent application Ser. Nos. 08/099,737, and 08/099,738, all of which are assigned to h.e.r.c. Incorporated, Phoenix, Ariz., and are incorporated herein by reference.

In practicing the inventive method, the active agent or mixture of active agents typically represents from about 0.005% to about 10% by weight of the dilute aqueous solution, and preferably the solution is made from deionized water.

If an amine is used as an active agent in the solution, the amine is preferably selected from the group consisting of ammonia, monoisopropanolamine, diisopropanolamine, triisopropanolamine, monoethanolamine, diethanolamine, triethanolamine, diethylamine, and mixtures thereof. If an organic carboxylic acid is used as an active agent, the acid preferably is selected from the group consisting of hydroxyacetic, citric, acetic, gluconic, salicylic, tartaric, benzoic, and mixtures thereof. Additionally, if an anionic surfactant is employed in the solution, the surfactant is preferably a sodium xylenesulfonate.

Although any of a number of different mixtures of active agents may be used in the dilute aqueous solution or rinse used to treat the contaminated surface, two mixtures are preferred. One mixture is a blend of hydroxyacetic acid, sodium xylenesulfonate, triethanolamine and diethanolamine. In the most preferred form of this blend, the hydroxyacetic acid represents about 50% by weight of the mixture, the sodium xylenesulfonate represents about 12%, the triethanolamine represents about 33% and the diethanolamine represents about 5%.

The other preferred mix of active agents is a blend of triethanolamine, diethanolamine and hydroxyacetic acid. In this blend, the mixture most preferably is a 50% solution of the 1:1 stoichiometric soap of 85% triethanolamine/15% diethanolamine and hydroxyacetic acid, with the mixture having a pH of about 7.

EXAMPLES

Several examples were performed to illustrate some of the aspects of the inventive method in removing chloride ion, a compound thereof, or flash rust from a contaminated surface. Various testing methods for measuring chloride contamination of metal surfaces have been reported (J. of Protective Coatings and Linings, March 1994, pages 76–83, "Methods for Sampling and Analyzing Soluble Salts on Steel Surfaces: A Comparative Study", by Flores, Simancas and Morcillo). In several of the following examples, the swabbing method followed by chloride analysis employing silver dichromate test strips available from Environmental Test Systems, Elkart, Ind., under the name "QUANTAB" was used.

Example 1

Calibration of the QUANTAB Strips

Known concentrations of chloride ion, as sodium chloride, in distilled water were prepared in the laboratory and tested with the QUANTAB silver dichromate test strips in order to obtain calibration readings for subsequent examples. The following calibration results were obtained:

TABLE 1

| CHLORIDE ION CONCENTRATION (ppm) | "QUANTAB" READING |
| --- | --- |
| 0.0 | 0.0 |
| 0.5 | 0.2 |
| 1.5 | 0.4 |
| 4.0 | 0.6 |
| 6.0 | 0.8 |
| 8.0 | 1.0 |
| 10–25 | 1.2 |
| 50 | 1.8 |
| 75 | 2.2 |
| 100 | 2.8 |
| 150 | 3.6 |
| 200 | 4.2 |
| 250 | 4.8 |
| 300 | 5.3 |
| 400 | 6.2 |
| 500 | 6.8 |
| 600 | 7.4 |

Example 2

Steel Test Panels Treated with Chloride Ion

In order to establish a reference level of chloride contamination on steel surfaces prior to chloride removal using the inventive method, several steel test panels were treated with various chloride solutions. The steel test panels were taken from The Q-Panel Co., Cleveland, Ohio. These panels were Type D made from standard low-carbon, cold-rolled steel complying with SAE 1010 with a smooth finish. The 0.01"×3"×6" test panels were contaminated with chloride ion by immersion in various treating solutions of sodium chloride or muriatic acid (31% hydrochloric acid) in distilled water for a period of at least four hours and allowed to air dry (see Table 2 below). In addition, some of the panels were rinsed extensively with distilled water or tap water as shown in Table 2.

The treated test samples had their original finish when removed from the treating solutions, but flash rusted rapidly. The flash rust (metal oxide) was evidenced by the development of a red color appearing on the surface.

The rinsed and unrinsed panels were tested for residual chloride using 20 mls of distilled water and 2 cotton balls. Using tweezers, the first cotton ball was moistened in the 20 mls of water, swabbed on the surface of the test panel, placed back in the 20 mls of water and swirled and squeezed against the side of the beaker. The swabbing was repeated four times. A fresh cotton ball was used to dry the test surface and also placed in the 20 mls of water. The chloride test was run on the 20 mls of distilled water containing the two cotton swab balls, using QUANTAB test strips to determine the chloride ion concentration. Various chloride ion concentration results were obtained using this procedure with different surface treating solutions and rinses as shown in Table 2.

TABLE 2

| TREATING SOLUTION | RINSE | ppm CHLORIDE |
| --- | --- | --- |
| 1.0% Sodium Chloride | None | 25 |
| 1.0% Sodium Chloride | Distilled Water | 1.5 |
| 1.0% Sodium Chloride | Tap Water | 1.5 |
| 2.0% Sodium Chloride | None | 35 |
| 2.0% Sodium Chloride | Distilled Water | 1.5 |
| 2.0% Sodium Chloride | Tap Water | 1.5 |
| 1.0% Muriatic Acid | Distilled Water | 75 |

Example 3

Chloride Treated Test Panels Rinsed with Various Solutions of the Inventive Method Steel test panels of the type described in Example 2 above were contaminated with a similar set of chloride treating solutions as those used in Example 2. The test panels then were rinsed with distilled water containing 1% by volume of various chemicals used in the inventive method as shown in Table 3, and the chloride ion concentrations were determined according to the swabbing and QUANTAB method described in Example 2.

TABLE 3

| TREATING SOLUTION | RINSE | ppm CHLORIDE | STATUS OF FLASH RUST * |
| --- | --- | --- | --- |
| 1.0% Muriatic Acid | 1% Triethanolamine-85 | 0.0 | (1) |
| 1.0% Muriatic Acid | 1% Sodium Xylenesulfonate (40%) | 0.0 | (1) |
| 1.0% Muriatic Acid | 1% Hydroxyacetic Acid (70%) | 25 | (2) |
| 1.0% Muriatic Acid | 1% Blend A | 0.0 | (2) |
| 1.0% Sodium Chloride | 1% Blend A | 0.0 | (2) |
| 2.0% Sodium Chloride | 1% Blend A | 0.0 | (2) |
| 1% Muriatic Acid | 1% Blend B | 4.0 | (3) |

* Status of Flash Rust:
(1) The rinse did not remove the flash rust from the surface.
(2) The rinse did remove the flash rust from the surface.
(3) The rinse removed some of the flash rust from the surface.

The various rinses used include 1% solutions of triethanolamine-85 (85% triethanolamine/15% diethanolamine), sodium xylenesulfonate (40%), hydroxyacetic acid (70%), and a Blend A and Blend B. Blend A is a combination of 41% by weight hydroxyacetic acid (70%), 23% by weight sodium xylenesulfonate (40%) and 23% by weight triethanolamine-85, with the balance being water. Blend B is a 50% aqueous solution of the 1:1 stoichiometric soap of triethanolamine-85 and hydroxyacetic acid (70%) having a pH of about 7.

The effect of the various rinses in removing chloride and flash rust is shown in Table 3. Both the triethanolamine-85 and sodium xylenesulfonate (40%) solutions were effective in removing chloride from the surface of the steel test samples. However, neither removed the flash rush from the surface. The hydroxyacetic acid (70%) removed some of the chloride, bringing the chloride ion concentration for a steel test sample treated with a 1.0% muriatic acid treating solution down from 75 ppm as shown in Table 2 to 25 ppm chloride as shown in Table 3. Also, the hydroxyacetic acid (70%) effectively removed the flash rust from the test sample surface.

Blend A was effective in removing both chloride and flash rush from the surface of the steel test samples. Because Blend A was effective in removing flash rust, while the triethanolamine-85 and sodium xylenesulfonate (40%) rinses were not, this shows that the hydroxyacetic acid (70%) component of Blend A is the effective ingredient in flash rust removal. Blend B removed most of the chloride and some of the flash rust, which is probably due to the equilibrium inherent in a soap or quaternary of a weak acid and a weak base which is in equilibrium with the soap, thus providing a chloride remover (triethanolamine-85) and a flash rush remover (hydroxyacetic acid (70%)) at low concentrations.

Example 4

Chloride Test Interferences

In order to determine the extent, if any, to which the various active ingredients and blends might skew the readings of chloride ion concentration (made using the QUANTAB test strips), a test was conducted in which each active ingredient and blend was combined with a solution of sodium chloride in distilled water. The chloride ion concentration of each sodium chloride solution had been determined using the QUANTAB test strips prior to the addition of the various active ingredients and blends. When the active ingredients and blends were added to the solutions, the previously measured chloride test results either remained the same or increased, as shown in Table 4. While neither distilled water nor sodium xylenesulfonate altered the readings, the triethanolamine-85, hydroxyacetic acid and blends including the two did increase the readings. Importantly, however, none of the results reduced the chloride readings. Therefore, the zero chloride results found in the accompanying examples are genuine readings of zero detectable chlorides.

TABLE 4

| SOLUTION TESTED | CHLORIDE LEVEL | | |
| --- | --- | --- | --- |
| | 0.0 | 25 PPM | 62 PPM |
| Distilled Water | 0.0 | 25 | 62 |
| 1% Triethanolamine-85 | 0.0 | 62 | 85 |
| 1% Sodium Xylenesulfonate (40%) | 0.0 | 25 | 62 |
| 1% Hydroxyacetic Acid (70%) | 90 | 90 | 125 |
| 1% Blend A | 25 | 50 | 100 |
| 1% Blend B | 0.5 | 25 | 75 |

Example 5

Chloride Testing on Aluminum

Aluminum test panels (3"×6") were cut from a sheet of aluminum and treated with 1% muriatic acid. The chloride test was performed according to the protocol described in Example 2, and the results are shown in Table 5. The 1% aqueous solution of Blend A removed all of the chloride ion from the aluminum surface.

TABLE 5

| TREATING SOLUTION | RINSE | ppm CHLORIDE |
| --- | --- | --- |
| 1% Muriatic Acid | None | 125 |
| 1% Muriatic Acid | Distilled Water | 1.5 |
| 1% Muriatic Acid | 1% Blend A | 0.0 |

Example 6

Chloride Testing on Steel Grit

Six 600 gm. samples of steel grit were treated with particular rinses as shown in Table 6, to determine the effect of the various rinses in removing chloride. Three of the samples tested had a coarse grit size of about 1/32" in diameter, while the other three samples had an ultra fine particle size. Two of the samples were extracted with 300 mls of distilled water by heating to reflux and then decanting the water extract, which was subsequently tested for chloride using the QUANTAB test strips. Another two samples were extracted with two treatments of distilled water, with the water extract similarly tested for chloride. Two other samples were extracted with a 1% solution of Blend A. This Blend A extract was decanted, and then the two samples were extracted once more with distilled water to obtain the solution which was tested for chloride (see Table 6). Although Blend A did not remove all chloride from the steel grit, the Blend did remove a substantial amount in comparison with the distilled water rinses.

TABLE 6

| GRADE | RINSE | ppm CHLORIDE |
| --- | --- | --- |
| Coarse | Distilled Water | 225 |
| Coarse | 2 × Distilled Water | 25 |
| Coarse | 1% Blend A & Distilled Water | 4.0 |
| Ultrafine | Distilled Water | 40 |
| Ultrafine | 2 × Distilled Water | 30 |
| Ultrafine | 1% Blend A & Distilled Water | 8.0 |

Example 7

Tank Treatment

A 3,000 gallon steel tank which had contained an acidic sludge from a copper mine was abrasive blasted to near white metal and then tested for surface chloride contamination with moist potassium ferricynide paper. The test showed surface chloride contamination.

The tank surface then was sprayed with 5 gallons of a 10% solution of Blend A using a siphon device aspirated into a tap water stream. The tank was allowed to drain and air dry. The surface was again tested for chloride with moist potassium ferricynide paper, which gave a negative result indicating that the surface chloride had been removed.

The invention is not limited to the examples discussed above, but on the contrary, is intended to cover the various modifications and equivalent arrangements included within the spirit and scope of the appended claims.

What is claimed is:

1. A method of removing chloride from a surface contaminated therewith, comprising the steps of:

providing a surface contaminated with chloride; and applying a dilute aqueous solution containing an active agent selected from the group consisting of an amine, anionic surfactant, organic carboxylic acid, organic sulfonic acid, and mixtures thereof to said surface in an amount sufficient to remove substantially all of said chloride from said surface, wherein said organic carboxylic acid is selected from the group consisting of hydroxyacitic, citric, acetic, gluconic, salicylic, tartaric, benzoic, and mixtures thereof.

2. The method of claim 1, wherein said surface is selected from the group consisting of metal, concrete, and plastic and laminates thereof.

3. The method of claim 2, wherein said plastic is epoxy or vinyl.

4. The method of claim 2, wherein said metal is selected from the group consisting of steel, iron and aluminum.

5. The method of claim 1, wherein said surface also is contaminated with flash rust, said method further removing at least a portion of said flash rust from said surface.

6. The method of claim 1, wherein said solution is made from deionized water.

7. The method of claim 1, wherein said active agent represents from about 0.005% to about 10% by weight of said dilute aqueous solution.

8. The method of claim 1, wherein said amine is selected from the group consisting of ammonia, monoisopropanolamine, diisopropanolamine, triisopropanolamine, monoethanolamine, diethanolamine, triethanolamine, diethylamine, and mixtures thereof.

9. The method of claim 1, wherein said anionic surfactant is sodium xylene sulfonate.

10. The method of claim 1, wherein said dilute aqueous solution comprises a mixture of hydroxyacetic acid, sodium xylene sulfonate, triethanolamine and diethanolamine.

11. The method of claim 10, wherein said hydroxyacetic acid represents from about 20% to about 70% by weight of said mixture, said sodium xylene sulfonate represents from about 5% to about 20% by weight of said mixture, said triethanolamine represents from about 10% to about 50% by weight of said mixture and said diethanolamine represents from about 2% to about 10% by weight of said mixture.

12. The method of claim 10, wherein said hydroxyacetic acid represents about 50% by weight of said mixture, said sodium xylene sulfonate represents about 12% by weight of said mixture, said triethanolamine represents about 33% by weight of said mixture and said diethanolamine represents about 5% by weight of said mixture.

13. The method of claim 1, wherein said aqueous solution comprises a mixture of triethanolamine, diethanolamine and hydroxyacetic acid.

14. The method of claim 13, wherein said triethanolamine represents from about 0.005% to about 25% by weight of said mixture, said diethanolamine represents from about 0.005% to about 10% by weight of said mixture and said hydroxyacetic acid represents from about 0.005% to about 35% by weight of said mixture.

15. The method of claim 13, wherein said mixture is a 50% solution of the 1:1 stoichiometric soap of 85% triethanolamine/15% diethanolamine and hydroxyacetic acid, said mixture having a pH of about 7.

* * * * *